United States Patent
Kim

Patent Number: 5,708,683
Date of Patent: Jan. 13, 1998

[54] SYMBOL RATE CONVERSION METHOD FOR CDPD DEMODULATOR

[75] Inventor: In-Kyung Kim, N. Potomac, Md.

[73] Assignee: Hughes Electronics, Los Angeles, Calif.

[21] Appl. No.: 397,665

[22] Filed: Feb. 28, 1995

[51] Int. Cl.⁶ ........................................ H04L 7/00
[52] U.S. Cl. ........................ 375/355; 375/377; 341/61
[58] Field of Search ........................ 375/354, 355, 375/272, 275, 377; 364/724.1, 166, 179, 239.1, 939.4; 370/84, 465; 341/61, 123; 348/387, 390

[56] References Cited

U.S. PATENT DOCUMENTS

| | | | |
|---|---|---|---|
| 4,453,259 | 6/1984 | Miller | 375/354 |
| 4,893,316 | 1/1990 | Janc et al. | 364/724.1 X |
| 5,331,346 | 7/1994 | Shields et al. | 364/724.1 X |
| 5,425,060 | 6/1995 | Roberts et al. | 364/724.1 X |

*Primary Examiner*—Tesfaldet Bocure
*Assistant Examiner*—Bryan Webster
*Attorney, Agent, or Firm*—John Whelan; Wanda Denson-Low

[57] ABSTRACT

A method of converting GMSK modulated signals arriving at an integer multiple of the IS-54 standard sampling (or symbol) rate (24.3 KHz) to GMSK modulated signals at an integer multiple of the CDPD standard sampling rate (19.2 KHz). In the preferred embodiment, the GMSK signals arrive as serial in-phase (I) samples and quadrature-phase (Q) samples at the IS-54 sampling rate. The method of the present invention combines into one calculation the following operations 1) time-alignment of the serial I and Q samples into IQ pairs, 2) conversion of the time-aligned IQ pairs to the CDPD sampling rate of 4×19.2 KHz, and 3) sign correction of each time-aligned IQ pair. Because of the periodic nature of certain variables in the above calculation, efficiency is further achieved with the present invention by storing tables containing the possible values of these variables, then using pointers to access the stored values as needed, thereby saving considerable processing power and time. The above-describe calculations and tables allow CDPD demodulation to be carried out on low power, inexpensive digital signal processors.

23 Claims, 4 Drawing Sheets

SYMBOL RATE CONVERSION METHOD FOR CDPD DEMODULATOR

Existing cellular network systems have enjoyed great popularity in recent years. At various times, the channels that carry the voice communications of the cellular system may be idle (i.e., no signal transmission over the channel at a particular time). These unused or idle voice channels may be utilized for other communication such as data communication. In particular, an overlay system network utilizing unused or idle voice channels for digital data communication is desirable. Cellular Digital Packet Data (CDPD) is such an overlay system which provides mobile datagram service utilizing existing cellular telephone networks. The CDPD system allows digital data transmission over idle channels of an already existing cellular system.

A consortium of cellular communication carriers prepared and released in 1993 a specification entitled "Cellular Digital Packet Data System Specification." The specification defines a protocol to be used by the industry when transmitting and receiving CDPD data messages over an existing cellular communication system. The protocol specifies that CDPD shall be transmitted at a symbol rate that is an integer multiple of 19.2 KHz. The protocol also specifies the format of the CDPD messages. More particularly, CDPD messages are transmitted in bursts, each having a preamble formed by a dotting sequence of 38 bits followed by a synchronization pattern of 22 bits. Following the preamble is the data sequence comprised of n multiples of 385 bits of data.

The CDPD overlay system utilizes the facilities of the existing cellular radiotelephone system to transmit data. In particular, a plurality of remote subscriber units, for example, cellular telephones, communicate with other mobile remote subscriber units or with the public switched telephone network (PSTN) through base stations. Remote subscriber units may also be stationary, for example mounted in an apartment complex. The data communication from the remote subscriber units to the base stations is wireless.

In order to allow cellular systems to transmit CDPD, existing voice-based base stations and cellular units must be modified to transmit and receive data in the CDPD protocol. In order to take full advantage of the existing cellular system, the CDPD transmissions should utilize as much of existing cellular hardware as possible. There are several obstacles to this objective. For example, digital voice TDMA (time-division multiple access) transmissions in existing cellular systems use a system clock operating at 24.3 KHz (or an integer multiple of 24.3 KHz). However, CDPD protocols transmit data at a rate of 19.2 KHz. Thus, a base station capable of transmitting and receiving digital voice and CDPD data must be able to process digital voice symbols at the TDMA rate of 24.3 KHz, along with CDPD data symbols at the CDPD rate of 19.2 KHz. This can involve complicated and elaborate calculations and translations requiring costly processing hardware.

Digital signal processors (DSP) are critical components of the demodulators/modulators that transmit and receive signals in cellular base stations. The DSPs that transmit and receive digital voice at the 24.3 KHz TDMA rate are powerful but expensive. Considerably less expensive and powerful are the DSPs that process analog voice. Thus, in designing the modulators and demodulators of a cellular base station, wherein the base station is capable of processing FM analog voice, TDMA-modulated digital voice and GMSK (gaussian minimum shift-keying) modulated CDPD data, it would be beneficial to design processing procedures that are capable of being implemented on the inexpensive and less powerful DSPs already found in most existing base stations.

SUMMARY OF THE INVENTION

The present invention provides an efficient and power-saving method of converting serial in-phase (I) and quadrature-phase (Q) symbols at the IS-54 standard symbol rate, to time-aligned IQ pairs at the CDPD standard symbol rate. Following the method of the present invention, symbol rate conversion, sample timing alignment, and sign corrections are all combined together, resulting in an efficient method of generating the desired samples at the CDPD symbol rate. Efficiency is further achieved with the present invention by incorporating a unique table construction method that saves considerable DSP processing time. As a result, the conversion protocol of the present invention is capable of being implemented on a less expensive and less powerful DSP, such as the TI C51 family of DSPs.

In general, the method of the present invention converts serial I symbols and Q symbols at a first sampling rate to time-aligned IQ pairs at a second sampling rate. The steps of the method include determining a first serial I symbol, determining a second serial I symbol, determining an I component of the IQ pair at the second sampling rate by interpolating between the first serial I symbol and the second serial I symbol, determining a first serial Q symbol, determining a second serial Q symbol, determining a Q component of the IQ pair at the second sampling rate by interpolating between the first serial Q symbol and the second serial Q symbol, the I component being time-aligned with the Q component to form the time-aligned IQ pair at the second sampling rate. Preferably, the first sampling rate is an integer multiple of 24.3 KHz, and the second sampling rate is an integer multiple of 19.2 KHz.

The method of the present invention calculates the above-described I component (sample $Y_I(n)$) and Q component (sample $Y_Q(n)$) according to the following equation, $$Y_{I,Q}(n) = [\delta'_n Z(k_n) - \delta_n Z(k_n+2)] c_{k_n} \quad (1)$$

where the sign correction sequence $\{c_{k_n}\}$ is defined as follows. For the input samples $\{Z(k)\}$ with sign inversion sequence $S_1$, $\{c_{k_n}\}$ is given as $$c_{k_n} = \begin{cases} +1 & \text{if int}(k_n/2) \text{ is even} \\ -1 & \text{if int}(k_n/2 \text{ is odd} \end{cases} \quad (2)$$

For the input samples $\{Z(k)\}$ with sign inversion sequence $S_2$, $\{c_{k_n}\}$ is given as follows. For $Y_I(n)$ computations, $$c_{k_n} = \begin{cases} +1 & \text{if int}(k_n/2) \text{ is even} \\ -1 & \text{if int}(k_n/2 \text{ is odd} \end{cases} \quad (3)$$

Similarly, for $Y_Q(n)$ computations, $$c_{k_n} = \begin{cases} -1 & \text{if int}(k_n/2) \text{ is even} \\ +1 & \text{if int}(k_n/2 \text{ is odd} \end{cases} \quad (4)$$

The invention itself, together with further objects and attendant advantages, will best be understood by reference to the following detailed description, taken in conjunction with the accompanying drawings.

DETAILED DESCRIPTION OF THE DRAWINGS

Figure 1:
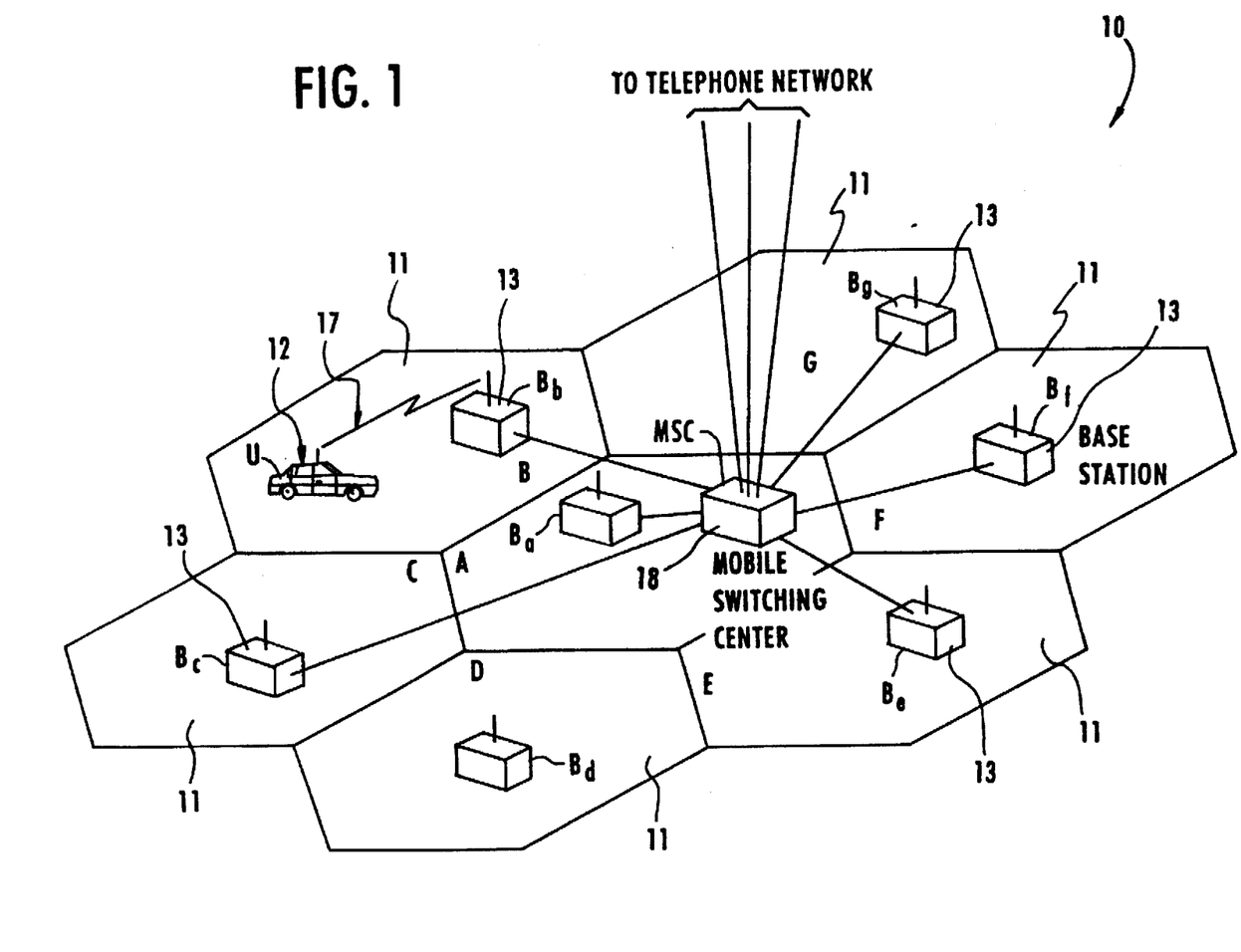
FIG. 1 is a general block diagram of a cellular radio communication system.

FIG. 1 is a general block diagram of a cellular radio communication system 10 incorporating a CDPD overlay. The following is a simplified description of the system 10, intended for illustrative purposes only. The existing cellular communication system 10 includes a plurality of remote subscriber units 12 (only one of which is illustrated). Geographical areas are divided into cells 11, and within each cell 11 is a base station 13 that transmits and receives signals from the remote subscriber units 12.

The base stations 13 are wire-connected to a mobile switching center 18, and the mobile switching center 18 is wire-connected to a PSTN. The remote subscriber units 12 communicate with other remote subscriber units through base stations 13. The remote subscriber units 12 may be mobile or stationary. The data communication between remote subscriber units 12 and base stations 13 is wireless (i.e., occurs over airlink 17).

Figure 2:
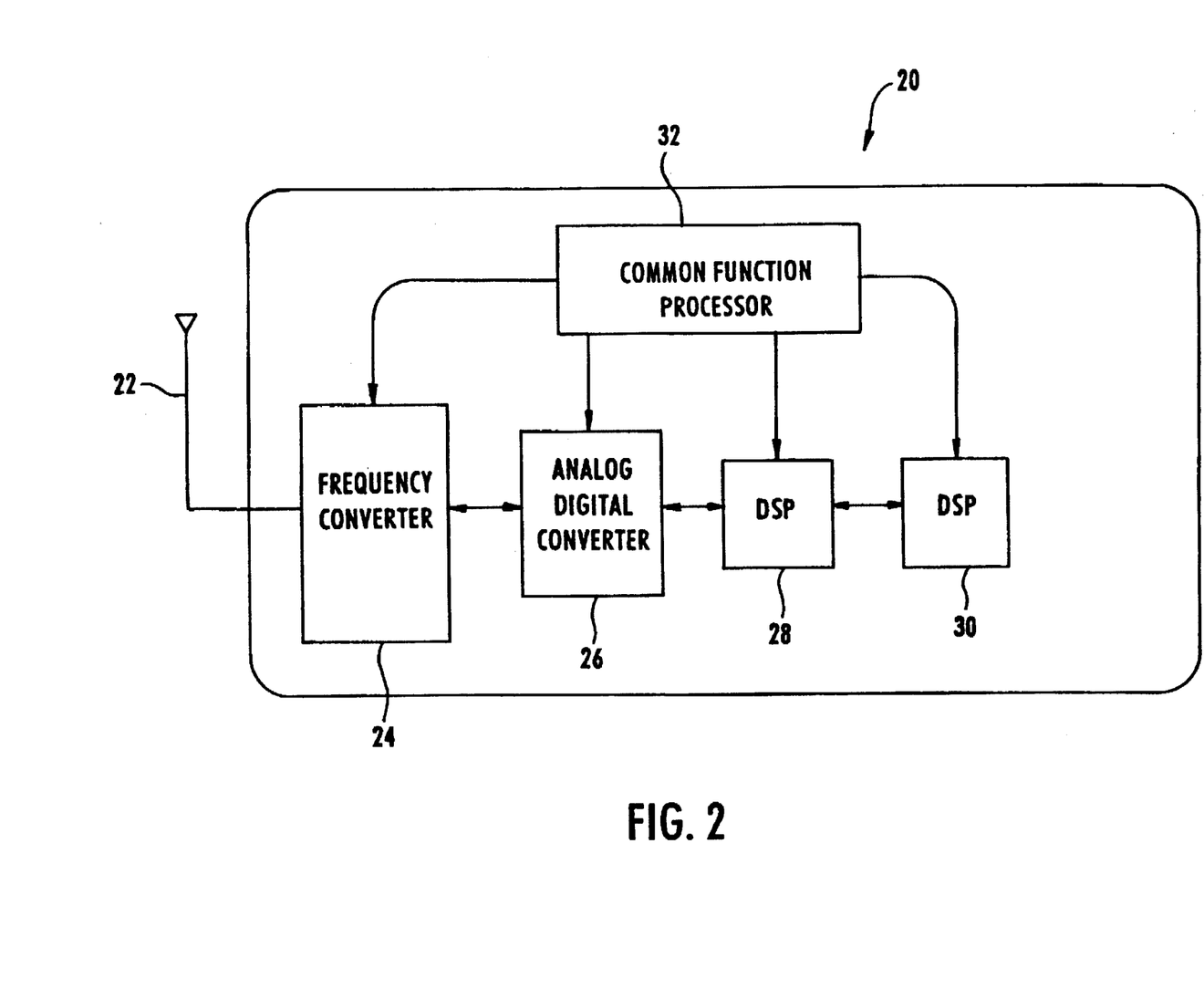
FIG. 2 is a block diagram of a transceiver embodying features of the present invention. The illustrated transceiver is part of the base station shown in FIG. 1.

FIG. 2 is a block diagram of a portion of a transceiver 20 embodying features of the present invention. FIG. 4 is a block diagram of a portion of the transceiver 20 shown in FIG. 2. In particular, FIG. 4 illustrates the frequency converter and analog-to-digital converter 24, 26 implemented as part of the MDM (modular downconverter module) section of the transceiver 20, along with the DSP 28 and various memories and buffers (a FIFO memory, a 324 circular FIFO buffer, and a 128 circular CDPD buffer) that participate in implementing the symbol rate conversion shown graphically in FIG. 3. The transceiver 20 shown in FIGS. 2 and 4 is part of the base station 13 shown in the cellular system 10 shown in FIG. 1. Preferably, the transceiver 20 has sufficient hardware components for processing frequency modulated analog voice, TDMA modulated digital voice, and GMSK modulated CDPD data. The transceiver 20 includes at least one antenna 22, a frequency converter 24, an analog/digital converter 26, several digital signal processors (DSP) 28, 30, and a common function processor 32. The antenna 22 receives the signal transmitted by a remote subscriber unit 12, and transmits signals to the remote subscriber units 12. For received signals, the frequency converter 24 strips away the carrier frequency, and the analog/digital converter 26 converts the resulting signal to baseband. For signals that are to be transmitted, the analog/digital converter 26 and the frequency converter 24 perform the opposite operations, converting the digital bit stream to analog, then converting the analog signal to the required RF frequency for transmission.

The analog/digital converters 26 are coupled to DSPs 28, 30 which perform the bulk of the modulation and demodulation required for transmitted and received signals. In a preferred embodiment, some of the DSPs 30 are model no. 96002 manufactured by Motorola Inc.. These DSPs 30 are powerful but expensive, and particularly suited for performing the complicated and elaborate processing required for TDMA digital voice signals. Other DSPs 28 are less powerful and expensive than the aforementioned DSPs 30, and are particularly suited for the relatively less complicated processing of analog voice signals. Preferably, the DSPs 28 are from the Texas Instruments (TI) C51 family of digital signal processors.

The common function processor 32 performs functions that are common to the frequency converter 24, analog/digital converters 26, and DSPs 28, 30, including for example handshaking, diagnostics, and slot interrupts.

The base station of a conventional voice-based cellular system is designed to process digital voice signals according to the IS-54 standard which designates that the clock rate of the system shall be an integer multiple of 24.3 KHz. However, under the CDPD standards, data is transmitted and received at a clock rate that is an integer multiple of 19.2 KHz.

CDPD data is transmitted in packets of "bi-nary" symbols, wherein each symbol comprises one bit that may be either zero (0) or one (1), and wherein each symbol has a duration $T_b$. In general, the symbols can be "N-nary," wherein each symbol comprises N bits, each of which may be either zero (0) or one (1), and wherein each symbol has a duration $T_r$. Thus, each N-ary symbol has N possible values.

In both TDMA digital voice and CDPD data transmissions, a 4-ary signalling scheme is used. CDPD uses the GMSK phase modulation process to map the 4-ary symbols into 4 different phases representing the actual electrical waveform. Thus, each symbol in the CDPD bit-stream is modulated to an in-phase (I) component and a quadrature-phase (Q) component.

The present invention is an efficient and power-saving method of converting GMSK modulated serial I and Q symbols, which have been transmitted on IS-54 standard hardware at the IS-54 standard symbol rate, to time-aligned IQ pairs at the CDPD standard symbol rate. A major hurdle overcome by the present invention is that the IS-54 standard symbol rate is a non-integer multiple of the CDPD symbol rate. Following the method of the present invention, symbol rate conversion, sample timing alignment, and sign corrections are all combined together, resulting in an efficient method of generating the desired samples at the CDPD symbol rate. Efficiency is further achieved with the present invention by incorporating a unique table construction method that saves considerable DSP processing time. As a result, the conversion protocol of the present invention is capable of being implemented on a less expensive and less powerful DSP, such as the TI C51 family of DSPs.

The frequency converter 24 and analog/digital converter 26 shown in FIGS. 2 and 4 provide I and Q samples serially to the CDPD DSP 28 at 4×24.3 KHz rate. To demodulate properly, the I and Q samples must be made available in time-aligned pairs at 4×19.2 KHz, which is the CDPD symbol rate. Also, because the I and Q samples are provided serially, the proper sign of each time-aligned IQ pair must also be recovered. Thus, one aspect of the present invention 1) time-aligns the serial I and Q symbols into IQ pairs, 2) converts the time-aligned IQ pairs to the CDPD symbol rate of 4×19.2 KHz, and 3) applies the correct sign to each time-aligned IQ pair.

Figure 3:
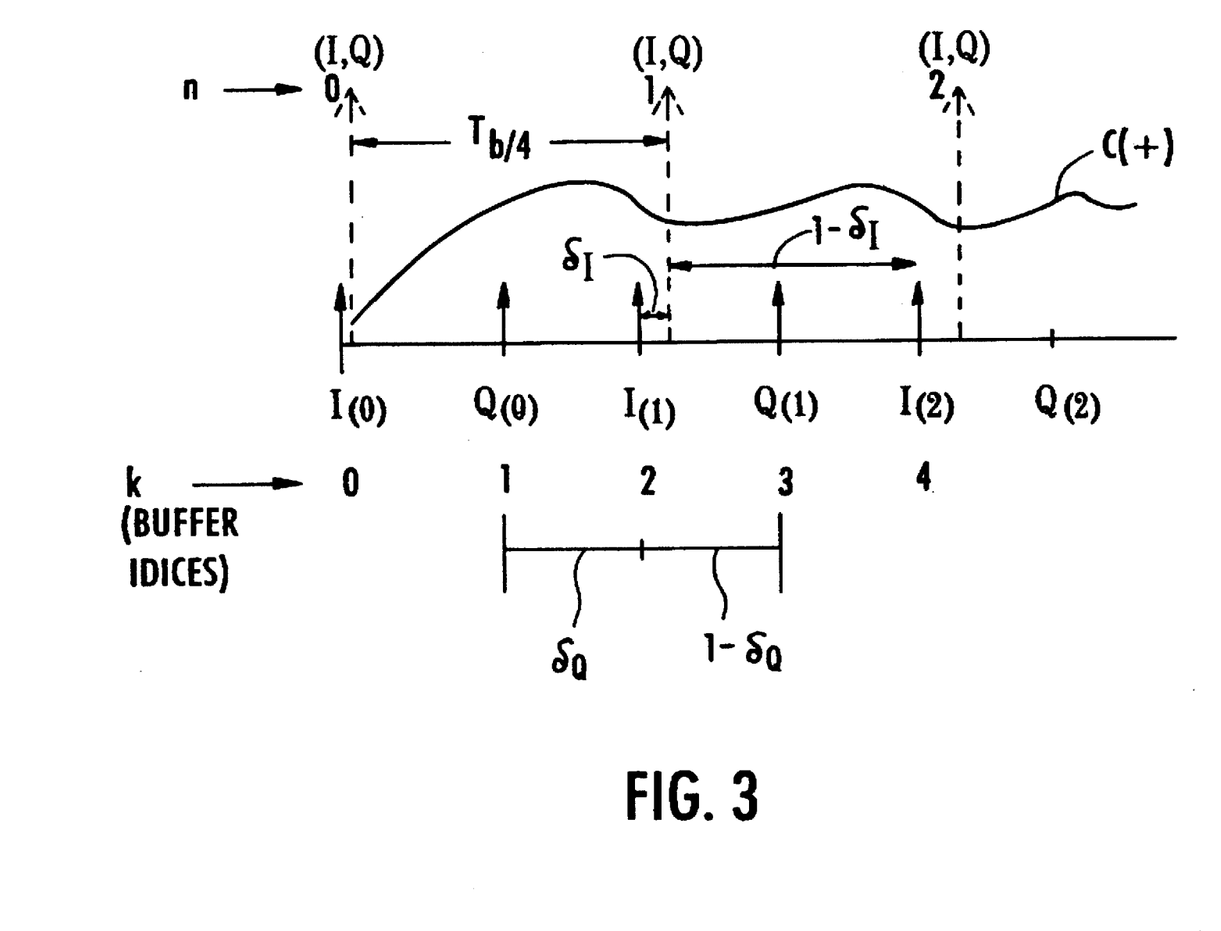
FIG. 3 is a graphical representation of serial I and Q symbols arriving at an integer multiple of the IS-54 standard symbol rate, along with the desired IQ pairs at an integer multiple of the CDPD standard symbol rate.
Figure 4:
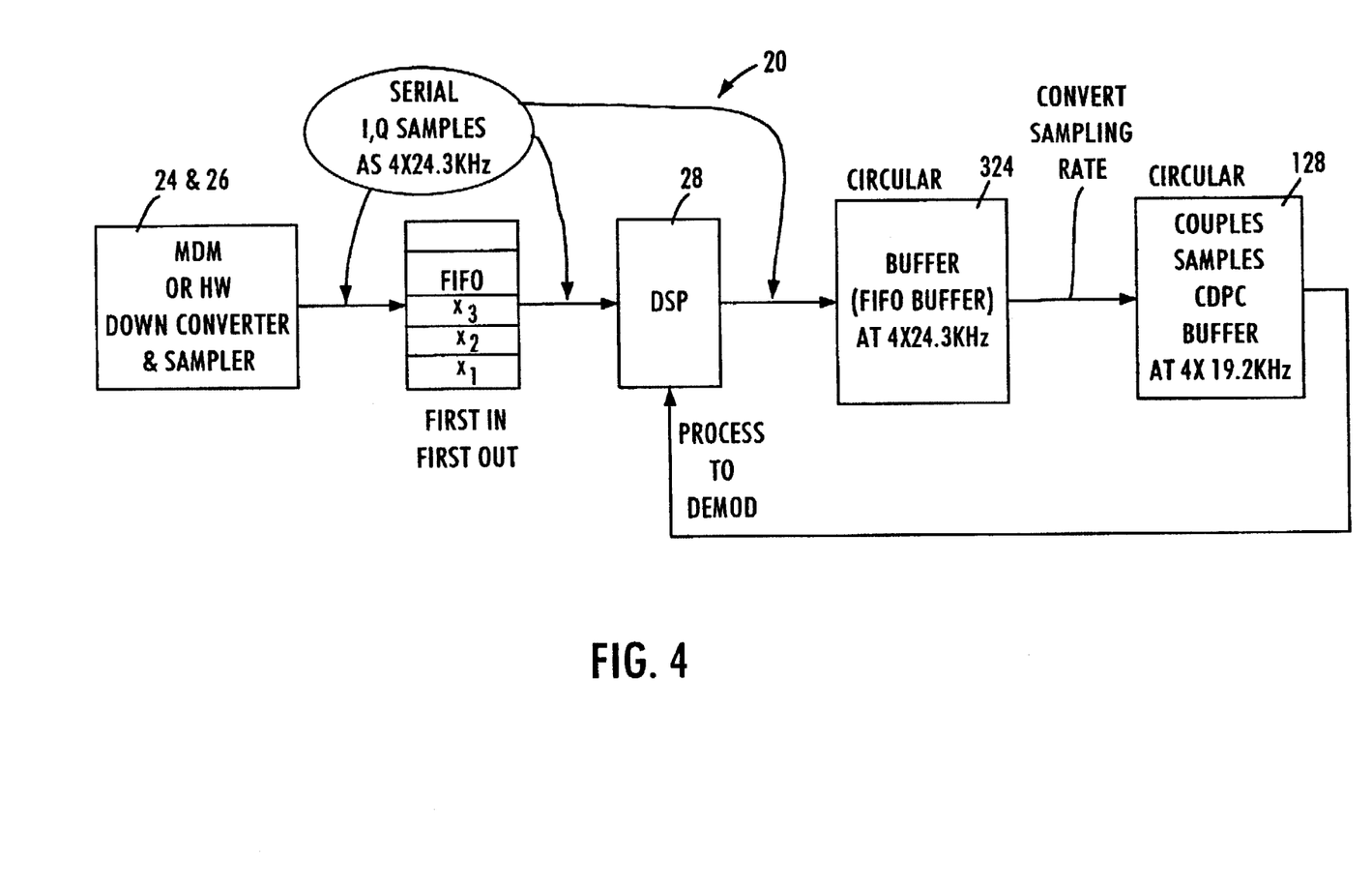
FIG. 4 is a block diagram of a portion of the transceiver shown in FIG. 2 embodying the present invention, including various memories and buffers that participate in implementing the symbol rate conversion shown graphically in FIG. 3.

FIG. 3 is a diagram illustrating serial I and Q symbols arriving at an integer multiple of the IS-54 standard symbol rate, along with the desired IQ pairs at an integer multiple of the CDPD standard symbol rate. In general, FIG. 3 is a "logical" representation of the serial I and Q symbols stored sequentially in a FIFO buffer (shown in FIG. 4 as a "324 FIFO Buffer") that interfaces the analog/digital converter 26 to the DSP 28. The serial I and Q symbols are represented by solid-line arrows, and the IQ pairs are represented by broken-line arrows. The indices "k" are numerical representations of the serial I and Q symbols, and the indices "n" are numerical representations of the rate-converted IQ pairs.

The present invention calculates the desired IQ pairs, sample $Y_I(n)$ and or $Y_Q(n)$, according to the following equation, $$Y_{I,Q}(n)=[\delta'_n Z(k_n)-\delta_n Z(k_n+2)]c_{k_n} \qquad (5)$$

where the sign correction sequence $\{c_{k_n}\}$ is defined as follows. For the input samples $\{Z(k)\}$ with sign inversion sequence $S_1$, $\{c_{k_n}\}$ is given as $$c_{k_n} = \begin{cases} +1 & \text{if } \text{int}(k_n/2) \text{ is even} \\ -1 & \text{if } \text{int}(k_n/2) \text{ is odd} \end{cases} \qquad (6)$$

For the input samples $\{Z(k)\}$ with sign inversion sequence $S_2$, $\{c_{k_n}\}$ is given as follows. For $Y_I(n)$ computations, $$c_{k_n} = \begin{cases} +1 & \text{if } \text{int}(k_n/2) \text{ is even} \\ -1 & \text{if } \text{int}(k_n/2) \text{ is odd} \end{cases} \qquad (7)$$

Similarly, for $Y_Q(n)$ computations, $$c_{k_n} = \begin{cases} -1 & \text{if } \text{int}(k_n/2) \text{ is even} \\ +1 & \text{if } \text{int}(k_n/2) \text{ is odd} \end{cases} \qquad (8)$$

Because of the periodic nature of the serial I and Q symbols, there are only a finite number of values for certain variables in equation (1). Thus, the possible values of these variables can be calculated for the different indices n, stored in a table, and accessed when needed in calculating the conversion values using equation (1). This significantly reduces the computations required for calculating $Y_I(n)$ and $Y_Q(n)$, while also correcting the signs of the I's and Q's, aligning I and Q timing into pairs, and performing the conversion from a non-integer multiple of the CDPD rate to 4×19.2 KHz, all in the same equation.

The following is a description of how the equations (1) to (4) above were developed. Referring in general to FIGS. 2–4, and in particular to FIG. 3, the first step is to align the serial I and Q symbols into IQ pairs at the desired CDPD symbol rate. This may be accomplished using a linear interpolation technique in which the two "I" values that are nearest to the desired IQ pair are determined. For n=1, $I_{(1)}$ and $I_{(2)}$ are used to determine the I interpolation, and $Q_{(0)}$ and $Q_{(1)}$ are used to determine the Q interpolation.

The symbol rate conversion algorithm is based on linear interpolation, which gives sufficient accuracy for implementing the present invention. However, non-linear interpolation techniques could also be used. $Y_I(n)$ and $Y_Q(n)$ denote the I and Q components of the rate-converted samples which ideally represent I and Q samples taken at $4R_2$ ($R_2=1/T_2$) rate (now I and Q samples in pairs are taken at the same time instant to form a complex envelope sample). To get $Y_I(n)$ or ($Y_Q(n)$ from $\{Z(k)\}$ using the linear interpolation method, two samples, $Z(k_n)$ and $Z(k_n+2)$, and two interpolation coefficients, $\delta_n$ and $\delta'_n$, are required. Because the I and Q samples are interlaced in $\{Z(k)\}$, the index $k_n$ corresponding to n is calculated as follows. Let $$k_r = \text{int}\left(\frac{81}{64} 2n\right),$$

where int (●) denotes integer part. For even $k_r$, $$k_n = \begin{cases} k_r & \text{for } Y_I(n) \text{ computation} \\ k_r - 1 & \text{for } Y_Q(n) \text{ computation} \end{cases} \qquad (9)$$

For odd $k_r$, $$k_n = \begin{cases} k_r - 1 & \text{for } Y_I(n) \text{ computation} \\ k_r & \text{for } Y_Q(n) \text{ computation} \end{cases} \qquad (10)$$

The interpolation coefficients (without sign corrections) are given by $$\delta_n = \begin{cases} \text{frac}\left(\frac{81}{64} n\right) & \text{for } Y_I(n) \text{ computation} \\ \text{frac}\left(\frac{81}{64} n - 0.5\right) & \text{for } Y_Q(n) \text{ computation} \end{cases} \qquad (11)$$

$$\delta'_n = 1 - \delta_n$$

where frac (.) denotes fractional part.

The "k" indices that represent "I" FIFO values will always be an even number because of the "2n" value. Similarly, the "k" indices that represent "Q" FIFO values will always be an odd number.

Thus, the interpolation can be accomplished by the following equation, $$Y_{I,Q}(n)=[\delta'_n Z(k_n)-\delta_n Z(k_n+2)]c_{k_n} \qquad (12)$$

As previously noted, the "logical" FIFO buffer (shown in FIG. 4) stores serial I and Q symbols sequentially from the frequency converter 24 and analog/digital converter 26 (shown in FIGS. 2 and 4). The "k" indices representing "I" symbols will be even numbers, and the "k" indices that represent "Q" symbols will be odd numbers. Thus, $$k_n=[(81/64)*2n]$$

Accordingly, if the index $k_n$ is even, the nearest symbol is "I", and, if the index $k_n$ is odd, the nearest sample is "Q". For "I" interpolations where $k_n$ is odd, the nearest buffer symbol to the interpolation point is a "Q" symbol, and therefore the equation moves back the get the closest "I" symbol. For "Q" interpolations where $k_n$ is even, the nearest buffer symbol to the interpolation point is an "I" symbol, and therefore the equation moves back the get the closest "Q" symbol.

The weighing factors, or interpolation coefficients, move the serial I and Q symbols by $T_2/8$ to align them with the desired IQ pairs at the CDPD symbol rate. In this case, the FIFO buffer that stores the serial I and Q symbols can be a so-called "circular" FIFO buffer (shown in FIG. 4) because the calculations described herein will repeat with the following relationship, $$kn=(81/64)* 2n$$

$$64\ kn=162\ n$$

The above-described equations, however, do not take into account sign correction. As previously described, the IS-54 symbol rate $R_1$ is 24.3 KHz, and the CDPD symbol rate $R_2$ is 19.2 KHz. The frequency converter 24 and analog/digital converter 26 (shown in FIG. 2) provide 8 real samples per $T_1=1/R_1$ using IF (intermediate frequency) sampling techniques and feeds the samples to the DSP 28. These 8 equally spaced samples represent 4 "I" and "Q" components sampled at different time instants with a particular sign inversion pattern. The IF sampled sequence can be represented as follows, $$Z(k) = \begin{cases} s_k I(T_s k) & \text{if } k = \text{even} \\ s_k Q(T_s k) & \text{otherwise} \end{cases} \quad (5)$$

where $T_s=\frac{1}{8}T_1$, and $\{s_k\}$ is one of the following two patterns, depending on the frequency plan of the frequency converter 24 (shown in FIG. 2) and sampling rate.

$$S_1=\{+1+1-1-1+1+1-1-1 \ldots \}$$

or $$S_1=\{+1-1-1+1+1-1-1+1 \ldots \}$$

In observing the above sign patterns, it can be seen that every other "I" has a sign flip, and every other "Q" has a sign flip. Thus, the sign of the interpolated IQ pairs must be modified to account for these sign flips. Thus, the final equation is $$Y_{I,Q}(n)=[\delta'_n Z(k_n)-\delta_n Z(k_n+2)]c_{k_n} \quad (13)$$

Because of the periodic nature of the interpolated IQ pairs, the IQ pattern repeats itself with proper sign alignment after 162 complex (324 real) FIFO buffer contents. Thus, the size of the circular FIFO buffer shown in FIG. 4 can be limited to 162 complex or 324 real.

The computational requirements can be even further reduced by taking advantage of the periodic nature of some of the variables in the above equations. By calculating all of the possible values of these coefficients, and the indices $k_n$ in tables for each n, all the logic and most of the computation in equations (1) can be avoided. Therefore, a significant amount of DSP processing power can be saved. Thus, following the present invention, the $Y_{I,Q}(n)$ computation is accomplished for each "n" by (1) retrieving the interpolation coefficients, or weighing factors, along with the "k" indices from a table (n serves as address or index for the tables), and (2) plugging the retrieved variables into above equations.

Table sizes can be determined in the following manner. In the disclosed example, the symbol clock ratio R=24300/19200=81/64. This means that 81 samples at the IS-54 rate give exactly 64 samples at CDPD rate. Ignoring sign inversions, the symbol conversion process is periodic in 81 IS-54 rate samples (or 64 CDPD rate samples). The sign inversion sequences $S_1$ and $S_2$ have period 4. If we have computed the first 64 CDPD pairs using the first 64 coefficient pairs, where n=0, 1, . . . 63, then the next 64 coefficient pairs are just the negatives of the first 64, where n=0, 1, . . . , 63. Therefore, the whole symbol rate conversion process is periodic in 128 CDPD rate samples. The table size for each coefficient (for each I and Q) is 128. Thus, the transceiver 20 can incorporate the circular CDPD buffer shown in FIG. 4 in order to maintain CDPD sample counter modulo 128 to read the coefficient tables and the $k_n$ values.

The following Fortran routine generates the coefficient tables for $S_1$ sequence, where coeI(n,0) and coeI(n,1) represent $b'_n$ and $b_n$ for $Y_I(n)$ computations, and coeQ(n,0) and coeQ(n,1) represent $b'_n$ for $Y_Q(n)$ computations.

```
r1=81./64.
do n=0,63
    indxI=int(r1*n)
    indxQ=int(r1*n-0.5)
    delI=frac(r1*n)
    delQ=frac(r1*n-0.5)
    delI_p=1-delI
    delQ_p=1-delQ
    if (n.eq.0) then
        indxQ=-1
        delQ=0.5
    end if
    if (mod(indxI,2).eq.0) then
        coeI(n,0)=delI_p
        coeI(n,1)=-delI
    else
        coeI(n,0)=-delI_p
        coeI(n,1)=delI
    endif
    if (mod(indxQ,2).eq.0) then
        coeQ(n,0)=delQ_p
        coeQ(n,1)=-delQ
    else
        coeQ(n,0)=-delQ_p
        coeQ(n,1)=delQ
    endif
enddo
do n=0,63
    coeI(n+64,0)=-coeI(n,0)
    coeI(n+64,1)=-coeI(n,1)
    coeQ(n+64,0)=-coeQ(n,0)
    coeQ(n+64,1)=-coeQ(n,1)
enddo
```

The following Fortran routine generates the coefficient tables for $S_2$ sequence.

```
r1=81./64
do n=0,63
    indxI=int(r1*n)
    indxQ=int(r1*n-0.5)
    delI=frac(r1*n)
    delQ=frac(r1*n-0.5)
    delI_p=1-delI
    delI_p=1-delQ
    if (n.eq.0)then
        indxQ=1
        delQ=0.5
    endif
    if(mod(indxI,2).eq.0) then
        coeI(n,0)=delI_p
        coeI(n,1)=-delI
    else
        coeI(n,0)=-delI_p
        coeI(n,1)=delI
    endif
    if (mod(indxQ,2).eq.0) then
        coeQ(n,0)=-delQ_p
        coeQ(n,1)=delQ
    else
        coeQ(n,0)=delQ_p
        coeQ(n,1)=-delQ
    endif
enddo
do n=0,63
    coeI(n+64,0)=-coeI(n,0)
    coeI(n+64,1)=-coeI(n,1)
    coeQ(n+64,0)=-coeQ(n,0)
    coeQ(n+64,1)=-coeQ(n,1)
enddo
```

The following Fortran routine generates the table for indices $k_n$, where indexI represents $k_n$ for $Y_I(n)$ computations and indexQ represents $k_n$ for $Y_Q(n)$ computations.

```
r1=81./64
do n=0,127
    indx=int (r1*n*2)
```

-continued

```
if (mod(indx,2).eq.0) then
    indxI=indx
    indxQ=indx-1
else
    indxI=indx-1
    indxQ=indx
endif
if (indxQ.eq.-1) then
    indxQ=81*2*2-1
endif
indexI(n)=indxI
indexQ(n)=indxQ
enddo
```

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of converting serial in-phase (I) symbols and quadrature-phase (Q) symbols at a first sampling rate to time-aligned IQ pairs at a second sampling rate, wherein said first sampling rate comprises a non-integer multiple of said second sampling rate, the steps comprising:

determining a first serial I symbol;

determining a second serial I symbol;

determining an I component of said IQ pair at said second sampling rate by interpolating between said first serial I symbol and said second serial I symbol, said interpolating including applying a first I-weighting factor to said first I-symbol and applying a second I-weighting factor to said second I-symbol;

determining a first serial Q symbol;

determining a second serial Q symbol;

determining a Q component of said IQ pair at said second sampling rate by interpolating between said first serial Q symbol and said second serial Q symbol;

said I component being time-aligned with said Q component to form said time-aligned IQ pair at said second sampling rate.

2. The method of claim 1 wherein said first sampling rate comprises an integer multiple of 24.3 KHz.

3. The method of claim 1 wherein said second sampling rate comprises an integer multiple of 19.2 KHz.

4. The method of claim 1 wherein:

said first sampling rate comprises an integer multiple of 24.3 KHz; and said second sampling rate comprises an integer multiple of 19.2 KHz.

5. The method of claim 1 wherein:

various possible values for said first I-weighing factor are stored in a table;

said step of applying said first I-weighing factor to said first I symbol comprises reading one of said values for said first I-weighing factor from said table of first I-weighing factor values;

various possible values for said second I-weighing factor are stored in a table; and said step of applying said second I-weighing factor to said second I symbol comprises reading one of said values for said second I-weighing factor from said table of second I-weighing factor values.

6. The method of claim 1 wherein:

various possible values of said first I symbol are stored in a table;

various possible values of said second I symbol are stored in a table;

said first serial I symbol is determined by reading a value for said first I symbol from said table of first I symbol values; and said second serial I symbol is determined by reading a value for said second I symbol from said table of second I symbol values.

7. The method of claim 1 further comprising the steps of:

assigning a plus or minus sign value to said I component; and assigning a plus or minus sign value to said Q component.

8. The method of claim 7 wherein said plus or minus sign values are retrieved from a table.

9. The method of claim 1 wherein:

said step of interpolating between said first I symbol and said second I symbol comprises applying a first I-weighing factor to said first I symbol, and applying a second I-weighing factor to said second I symbol;

various possible values for said first I-weighing factor are stored in a table;

said step of applying said first I-weighing factor to said first I symbol comprises reading one of said values for said first I-weighing factor from said table of first I-weighing factor values;

various possible values for said second I-weighing factor are stored in a table;

said step of applying said second I-weighing factor to said second I symbol, comprises reading one of said values for said second I-weighing factor from said table of second I-weighing factor values;

various possible values of said first I symbol are stored in a table;

various possible values of said second I symbol are stored in a table;

said first serial I symbol is determined by reading a value for said first I symbol from said table of first I symbol values; and said second serial I symbol is determined by reading a value for said second I symbol from said table of second I symbol values.

10. The method of claim 9 further comprising the steps of:

assigning a plus or minus sign value to said I component; and assigning a plus or minus sign value to said Q component.

11. The method of claim 10 wherein said plus or minus sign values are retrieved from a table.

12. The method of claim 9 wherein said first sampling rate comprises a non-integer multiple of said second sampling rate.

13. The method of claim 12 wherein:

said first sampling rate comprises an integer multiple of 24.3 KHz; and said second sampling rate comprises an integer multiple of 19.2 KHz.

14. The method of claim 1 wherein said step of interpolating between said first Q symbol and said second Q symbol comprises:

applying a first Q-weighing factor to said first Q symbol; and applying a second Q-weighing factor to said second Q symbol.

15. The method of claim 14 wherein:

various possible values for said first Q-weighing factor are stored in a table;

said step of applying said first Q-weighing factor to said first Q symbol comprises reading one of said values for said first Q-weighing factor from said table of first Q-weighing factor values;

various possible values for said second Q-weighing factor are stored in a table; and said step of applying said second Q-weighing factor to said second Q symbol comprises reading one of said values for said second Q-weighing factor from said table of second Q-weighing factor values.

16. The method of claim 1 wherein:

various possible values of said first Q symbol are stored in a table;

various possible values of said second Q symbol are stored in a table;

said first serial Q symbol is determined by reading a value for said first Q symbol from said table of first Q symbol values; and said second serial Q symbol is determined by reading a value for said second Q symbol from said table of second Q symbol values.

17. The method of claim 1 further comprising the steps of:

assigning a plus or minus sign value to said Q component; and assigning a plus or minus sign value to said Q component.

18. The method of claim 17 wherein said plus or minus sign values are retrieved from a table.

19. The method of claim 1 wherein:

said step of interpolating between said first Q symbol and said second Q symbol comprises applying a first Q-weighing factor to said first Q symbol, and applying a second Q-weighing factor to said second Q symbol;

various possible values for said first Q-weighing factor are stored in a table;

said step of applying said first Q-weighing factor to said first Q symbol comprises reading one of said values for said first Q-weighing factor from said table of first Q-weighing factor values;

various possible values for said second Q-weighing factor are stored in a table;

said step of applying said second Q-weighing factor to said second Q symbol comprises reading one of said values for said second Q-weighing factor from said table of second Q-weighing factor values;

various possible values of said first Q symbol are stored in a table;

various possible values of said second Q symbol are stored in a table;

said first serial Q symbol is determined by reading a value for said first Q symbol from said table of first Q symbol values; and said second serial Q symbol is determined by reading a value for said second Q symbol from said table of second Q symbol values.

20. The method of claim 19 further comprising the steps of:

assigning a plus or minus sign value to said Q component; and assigning a plus or minus sign value to said Q component.

21. The method of claim 20 wherein said plus or minus sign values are retrieved from a table.

22. The method of claim 19 wherein said first sampling rate comprises a non-integer multiple of said second sampling rate.

23. The method of claim 22 wherein:

said first sampling rate comprises an integer multiple of 24.3 KHz; and said second sampling rate comprises an integer multiple of 19.2 KHz.

* * * * *